United States Patent [19]

Jacobson

[11] Patent Number: 4,711,772
[45] Date of Patent: Dec. 8, 1987

[54] PREPARATION OF HYDROGEN PEROXIDE

[75] Inventor: Stephen E. Jacobson, Morristown, N.J.

[73] Assignee: The BOC Group, Inc., Montvale, N.J.

[21] Appl. No.: 909,057

[22] Filed: Sep. 18, 1986

[51] Int. Cl.$^4$ ............................................. C01B 15/02
[52] U.S. Cl. ................................................... 423/584
[58] Field of Search ........................................ 423/584

[56] References Cited

U.S. PATENT DOCUMENTS

| | | | |
|---|---|---|---|
| 302,800 | 7/1884 | Traube | 423/584 |
| 1,108,752 | 8/1914 | Henkel et al. | 423/584 |
| 3,361,533 | 1/1968 | Hooper et al. | 423/584 |
| 4,007,256 | 2/1977 | Kim et al. | 423/584 |
| 4,128,627 | 12/1978 | Dyer et al. | 423/584 |
| 4,336,239 | 6/1982 | Dalton, Jr. et al. | 423/584 |
| 4,336,240 | 6/1982 | Moseley et al. | 423/584 |
| 4,462,978 | 7/1984 | Brill | 423/584 |
| 4,477,685 | 10/1984 | Chan | 423/584 |

OTHER PUBLICATIONS

Kinet Katal, 1979, 20 (6) 1599–1600.
Advanced Organic Chemistry, 2nd ed. McGraw-Hill, 1977, p. 21.

Primary Examiner—John Doll
Assistant Examiner—Wayne A. Langel
Attorney, Agent, or Firm—Larry R. Cassett; David A. Draegert; R. Hain Swope

[57] ABSTRACT

Hydrogen peroxide is produced in a reaction between carbon monoxide, oxygen, and water in the substantial absence of gaseous hydrogen in the presence of a solvent using a soluble palladium compound as a catalyst and employing an arsine or phosphine ligand.

31 Claims, No Drawings

PREPARATION OF HYDROGEN PEROXIDE

PRIOR ART

The invention relates to the production of hydrogen peroxide, a material of commercial importance, which is used in large volumes for bleaching and chemical oxidations. Industrially, hydrogen peroxide is produced primarily by the alternative oxidation and reduction of alkyl anthraquinone.

Other methods of producing hydrogen peroxide have been studied. One method of interest with respect to the present invention is the direct oxidation of hydrogen with gaseous oxygen, generally in the presence of a catalyst. Such a process was known at least as early as 1914, for example, see U.S. Pat. No. 1,108,752 to Henkel, et al. In that patent hydrogen and oxygen were reacted in the presence of palladium as a catalyst in a water solution. More recently, considerable interest has been shown in further development of this process. In U.S. Pat. No. 4,007,256 Kim, et al., employ a supported palladium catalyst and a solvent comprising water, acid, and a nitrogen-containing compound. Dalton, et al., U.S. Pat. No. 4,336,239 discloses a similar system using an acidic organic or nitrogenous compound as a solvent. Hooper, et al., in U.S. Pat. No. 3,361,533 discloses the use of Group 1 or Group 8 metals, preferably palladium, supported on a solid and employs a working solution comprising water, acid, or oxygen-containing organics such as acetone. Alternative schemes are represented by Dyer, et al., U.S. Pat. No. 4,128,627 who employs a Group 8 metal, preferably palladium, which is linked to Group 5b compounds, peferably phosphorus. Again, water and organic materials are used as solvents. Moseley, et al. in U.S. Pat. No. 4,336,240 shows a similar system, but employs fluorocarbons as solvents.

Another process reacts carbon monoxide and oxygen with water to form hydrogen peroxide and carbon dioxide. An early patent, U.S. Pat. No. 302,800 to Traube, shows a mixed water gas containing carbon monoxide and hydrogen will produce hydrogen peroxide when burned with oxygen in a flame and then contacted with liquid water. Insufficient details are provided to determine the extent to which carbon monoxide and hydrogen produce hydrogen peroxide in this method, but it is clear that such a high temperature non-catalytic procedure where both carbon monoxide and hydrogen are present is readily distinguished from the process to be disclosed hereinafter.

A more recent disclosure by Zudin, et al., in Kinet Katal 1979 20 (6) 1599–1600 clearly discloses the reaction of carbon monoxide and oxygen with water in the presence of a palladium catalyst associated with phosphine ligands and using methylene chloride as a solvent. Zudin employed titanium (IV) sulfate in order to trap hydrogen peroxide in the water phase to reduce decomposition and to assist in its recovery.

In U.S. Pat. No. 4,462,978 Brill showed that the reaction of carbon monoxide, oxygen, and water could be carried out even in the absence of the phosphine and the titanium sulfate trapping agents employed by Zudin, et al.

The present invention relates to an improved method of preparing hydrogen peroxide by the reaction of carbon monoxide, water, and oxygen, which employs unique ligands but does not employ an additional chemical reaction for trapping hydrogen peroxide as it is produced.

SUMMARY OF THE INVENTION

Hydrogen peroxide is produced in a reaction involving carbon monoxide, oxygen and water in the substantial absence of gaseous hydrogen. The reaction is carried out in the presence of a soluble palladium compound, such as palladium nitrate, palladium 2,4-pentanedionate, palladium sulfate, and preferably palladium acetate. The catalyst concentration may be about 0.001–0.5 mol catalyst/liter of solution and preferably is 0.001–0.01 mol catalyst/liter of solution. The performance of the catalyst is improved by including a triaryl arsine ligand, such as tris (p-fluoro phenyl) arsine, tris (p-trifluoro methyl phenyl) arsine, preferably triphenylarsine. Also, certain triaryl phosphines with electron withdrawing groups are useful, such as penta fluoro phenyl diphenyl phosphine, bis (penta fluoro phenyl) phenyl phosphine, and tris (p-trifluoro methyl phenyl) phosphine. Sufficient ligand is employed to provide a molar ratio of ligand/Pd of at least 10/1, preferably 20/1 to 100/1.

A solvent is employed to facilitate the reaction. Preferably, the solvents are insoluble in water, or nearly so. Since the solvents must dissolve the catalyst, the amount used will depend on its ability to maintain the catalyst in solution. Useful solvents include chlorinated hydrocarbons, such as chloroform, dichloromethane, 1,2-dichloroethane, and particularly 1,2,4-trichlorobenzene and fluorinated hydrocarbons such as monofluoro benzene and hexafluoro benzene.

A non-coordinating acid is used such as sulfuric acid, trifluoro sulfonic acid, and Nafion (perfluoro sulfonic acid) in an amount sufficient to form a complex with the soluble palladium species.

Sufficient amounts of the reacting gases (i.e. CO and $O_2$) are supplied to maintain a total pressure of above 1 atmosphere. The molar ratio of $CO/O_2$ may be 1/100 to 50/100, as determined by the catalyst and solvent employed, but a low mol ratio is preferred, such as 1/100 to 1/10.

The reaction is carried out at temperatures in the range of $-78°$ to $+150°$ C., preferably $-20°$ to $+50°$ C.

DESCRIPTION OF THE PREFERRED EMBODIMENTS

The process of the invention may be described by means of the following overall reaction.

$$CO + H_2O + O_2 \xrightarrow{\text{Catalyst}} H_2O_2 + CO_2$$

The reaction is catalyzed by a soluble palladium compound. Without the presence of such metal compounds, no reaction occurs. It is believed that addition of the triphenyl phosphine ligands preferred by Zudin, et al. has a detrimental effect upon the hydrogen peroxide produced. Triaryl phosphines with electron with drawing groups or the arsine ligands of the present invention permit higher concentrations of hydrogen peroxide. It has been found that trapping the hydrogen peroxide as done by Zudin, et al., is not required.

EXAMPLE 1

Comparative

Palladium acetate (0.0056 g, 0.025 mmoles) and triphenyl phosphine (0.0655 g, 0.25 mmoles) are dissolved in 10 g of dichloromethane in a glass lined 200 ml. Parr Hoke bomb. Water (6.0 g) and sulfuric acid (0.10 g) are added to form a separate aqueous layer. The bomb is then sealed, placed in a bath maintained at 20° C., and pressured to 2.76 bar partial pressure of CO and 62.07 bar partial pressure of $O_2$. The reaction is carried out for 2 hours with the mixture being stirred by a magnetically driven impeller. After depressuring the bomb, the hydrogen peroxide content of the solution is measured by titration with a standard ceric nitrate solution and found to be 0.04 wt. %, which is equivalent to one turnover, that is, the reduction of $PD^{+2}$ to $Pd^0$. By comparison, the results of Zuden et al., who used titanium (IV) sulfate to trap hydrogen peroxide, showed a turnover of five after 12 hours, thus indicating that a catalytic effect was being achieved and that titanium (IV) sulfate was required.

The process may be carried out batchwise or continuously. In a batch process, the liquid components of the working solution would be charged to a pressure vessel. These would include the solvent and a suitable amount of water. The solvents must be substantially insoluble in water so that a separate phase is formed. The catalyst will be dissolved in the organic phase of the working solution. The vessel would be closed and pressured to the desired level with carbon monoxide and oxygen. Using suitable agitation to assure good contacting of the reactants and controlling the temperature to the desired range, the reaction would be carried out until sufficient hydrogen peroxide had been produced. After the desired amount of hydrogen peroxide has been produced, the vessel would be depressured and the hydrogen peroxide in the aqueous phase decanted from the organic phase of the working solution.

A continuous reaction could be carried out by various techniques familiar to those skilled in the art. For example, the batch reaction described above could be adapted to a continuous operation in which the gases are withdrawn and the carbon dioxide removed by scrubbing and the gases returned to the reactor, adding makeup carbon monoxide and oxygen as required. The hydrogen peroxide formed in the reactor could be recovered by allowing a portion of the working solution to settle, decanting the aqueous phase, and returning the organic phase to the reactor.

The conditions under which the reaction is carried out will be selected to most efficiently provide the desired conversion of water to hydrogen peroxide. The temperature employed will be determined by various factors. Sub-ambient temperatures are favored to provide good yields of hydrogen peroxide, but since refrigeration is required to obtain low temperatures, increased costs are incurred. Broadly, the reaction may be carried out at temperatures between about −78° and +150° C., preferably between about −20° and +50° C. The operating pressure should be above atmospheric (i.e. above 1 bar) in order to supply ample carbon monoxide and oxygen per unit of reactor volume relative to the liquid working solution. The total partial pressure of carbon monoxide and oxygen combined should be above about 20 bar. The molar ratio of carbon monoxide to oxygen may be between 1/100 to 50/100, but a relatively low ratio is preferred, particularly about 1/100 to 1/10. It has been found that above a molar ratio of about 1/10, very little hydrogen peroxide is produced. (See Example 14 below).

The working solution, excluding the dissolved catalyst and the ligand, comprises primarily a solvent and water. Water is a reactant and therefore must be present in sufficient amount to produce the desired hydrogen peroxide. However, a second phase is necessary to separate the palladium catalyst from the hydrogen peroxide which is formed, since palladium will decompose hydrogen peroxide as well as catalyze its formation.

The solvent is a very important component of the working solution. As will be seen, extent of the reaction appears to be strongly affected by the type of solvent used, suggesting that it may play a part in the reaction itself, although the actual roles of the solvent has yet to be understood. Generally, solvents will include halogenated hydrocarbons. Preferably chlorinated aliphatic or aromatic compounds are used such as dichloromethane, chloroform, 1,2 dichloroethane and the like; 1,2,4 trichlorobenzene is preferred. As will be seen, fluorinated hydrocarbons such as fluorinated benzenes may be used. The amount of solvent is not especially critical. At least enough is used to dissolve the palladium compound and the ligand.

The presence of an acid, preferably a non-coordinating acid, such as trifluoro sulfonic acid, tetrafluoro boric acid, acetic acid, preferably sulfuric acid, has been found necessary. A non-coordinating acid will form a complex of the type $[PdL_2^{+2}]2X^-$ where $X^-$ is a non-coordinating anion of the acid and L is a ligand according to the invention. A coordinating anion such as a chloride will form a neutral complex of the type $PdL_2X_2$. An example of a coordinating acid, which has been found to produce very little hydrogen peroxide, is given in example 3. Tests of some acids have been found to produce little hydrogen peroxide, even when the preferred arsine ligand and palladium compound are employed (see Example 3 below).

The reaction of carbon monoxide, water, and oxygen to form hydrogen peroxide and carbon dioxide is catalyzed by palladium but other Group 8 noble metals are much less effective when used with an arsine ligand. Example 11 will show that platinum is substantially ineffective. In addition, it has been found that supported Group 8 noble metals are inactive (see Example 12 below).

The palladium catalyst typically will be in the form of a metal compound, such as chloride, acetate, or nitrate. Typical of the compounds found to be useful are palladium 2,4-pentanedionate and palladium acetate.

The amount of catalytic metal may be expressed as a concentration in the working solution of about 0.001 to 0.5 mol noble metal per liter of working solution. Preferably, about 0.001 to 0.01 mol per liter are employed.

It has been found that the use of arsines as ligands provides a system in which the palladium has catalytic properties, as will be seen in the following examples. Triaryl arsines are particularly useful, including tris (p-fluoro phenyl) arsine, tris (p-trifluoro methyl phenyl) arsine, and preferably triphenyl arsine. The molar ratio of ligand/Pd should be at least 10/1, preferably it will be in the range of 20/1 to 100/1.

The triphenyl phosphine of Zudin, et al. may contribute to the decomposition of hydrogen peroxide, as Example 1 suggests. However, it has been discovered that certain phosphines having electron withdrawing groups are much more effective than triphenyl phosphine or mixed alkyl aryl phosphines and substantially higher concentrations of hydrogen peroxide can be achieved. Examples of triaryl phosphines with electron withdrawing groups are pentafluoro phenyl diphenyl phosphine, bis (pentafluoro phenyl) phenyl phosphine, and tris (p-trifluoro methyl phenyl) phosphine. A discussion of phosphines which contain electron withdrawing groups may be found in U. S. 4,477,685 and in Advanced Organic Chemistry, 2nd ed., March, McGraw-Hill 1977, p. 21.

EXAMPLE 2

Palladium acetate (0.0056 g, 0.025 mmoles) and triphenyl arsine (0.612 g, 2 mmoles) are dissolved in 10 g of 1,2,4-trichloro benzene. The solution is placed in a glass-lined 200 ml Parr Hoke bomb. Water (6.0 g) and sulfuric acid (0.10 gm) are then added to form a separate aqueous layer. The bomb is sealed and placed in a bath maintained at 20° C., pressured to 2.76 bar with carbon monoxide and 62 bar with oxygen. The reaction is carried out for two hours with the mixture being stirred magnetically. After depressuring the bomb, the aqueous phase is titrated and the hydrogen peroxide found to be 1.2 wt. %. This is equivalent to 87 turnovers based on the amount of palladium present, indicating a catalytic reaction has occurred.

EXAMPLE 3

(Comparative)

The experiment of Example 2 is repeated except that sulfuric acid is replaced by 0.12 g of hydrochloric acid. After two hours, analysis of the aqueous layer in the bomb shows that no hydrogen peroxide had been made. Thus, hydrochloric acid which is used in the reaction of hydrogen and oxygen to produce hydrogen peroxide is not useful in the present reaction.

EXAMPLE 4

The experiment of Example 2 is repeated again, but Nafion (0.8 g, 0.7 mmole), a fluorinated polymer with sulfonated groups manufactured by DuPont, was used instead of sulfuric acid. Instead of 1,2,4-trichlorobenzene, 1,2-dichloroethane (10 g) is used as a solvent, along with 12 g of water. Analysis of the aqueous phase after 2 hours shows 0.19 wt. %, equivalent to 27 turnovers based on the palladium content.

EXAMPLE 5

Again, the experiment of Example 2 is repeated, except that trifluoro acetic acid (0.14 g) is used instead of sulfuric acid. After two hours, the aqueous phase is titrated and found to contain 0.12 wt. % hydrogen peroxide, equivalent to 8 turnovers of the palladium available.

EXAMPLE 6

Palladium acetate (0.0056 g, 0.025 mmoles) and pentafluoro phenyl-diphenyl phosphine (0.704 g, 2 mmole) are dissolved in 6.0 g of dichloromethane. Sulfuric acid (0.4 g) and water (6.0 g) are added to form a separate phase. The two phase solution is then placed in a glass lined 200 ml Parr Hoke bomb and pressured to partial pressures of 4.1 bar of carbon monoxide and 20.7 bar of oxygen and then reacted for two hours at 20° C. Titration of the aqueous phase shows 0.3 wt. % hydrogen peroxide, equivalent to 20 turnovers of the palladium present.

EXAMPLE 7

Palladium acetate (0.0056 g, 0.025 mmoles) and tris (p-trifluoro methyl phenyl) phosphine (0.464 g, 1.0 mmoles) are dissolved in 10.0 g of 1,2,4-trichlorobenzene. Water (6.0 g) and sulfuric acid (0.10 g) are then added to form a second phase, and then placed in the glass lined 200 Parr Hoke bomb and pressured to partial pressures of 2.8 bar of carbon monoxide and 62.1 bar of oxygen. After 2 hours reaction at 20° C., the aqueous phase is found to contain 0.43 wt. % hydrogen peroxide, equivalent to 28 turnovers of the palladium present.

EXAMPLE 8

Comparative

Not all phosphines are useful in the reaction, as will be seen in the following experiment.

Palladium acetate (0.0056 g, 0.025 mmoles) and tris (penta fluoro phenyl) phosphine (1.33 g, 2.5 mmoles) are dissolved in 6.0 g dichloromethane. Water (6.0 g) and sulfuric acid (0.40 g) are added to form a second phase, which is then placed in the 200 ml bomb previously mentioned and pressured to partial pressures of 2.8 bar of carbon monoxide and 62.1 bar of oxygen. After 2 hours at 20° C., no hydrogen peroxide has formed and a black insoluble palladium precipitate is present. It is concluded that the phosphine of this experiment is not useful.

The experiment is repeated with half the amount of the same phosphine (0.66 g, 1.25 mmoles) and again no hydrogen peroxide is produced.

The same experiment with 1,2,4-trichlorobenzene substituted for dichloromethane produces the same negative result.

EXAMPLE 9

(Comparative)

Palladium acetate (0.0056 g, 0.025 mmoles) and triphenyl antimony (0.353 g, 1 mmole) are dissolved in dichloromethane (6 g). Water (6.0 g) and concentrated sulfuric acid (0.4 g) are added to form a second phase. As before, the two phase mixture is reacted for two hours at 20° C. and at partial pressures of 2.8 bar carbon monoxide and 62.1 bar oxygen. No hydrogen peroxide was made.

A repeat of this experiment using 0.706 g triphenyl antimony (2 mmole) also produces no hydrogen peroxide.

EXAMPLE 10

(Comparative)

Palladium acetate (0.0056 g, 0.025 mmole) and triphenyl phosphate (0.0828 g, 0.25 mmole) are dissolved in 1,2,4-trichlorobenzene (10.0 g). Water (6.0 g) and sulfuric acid (0.10 g) were added to form a second phase. The mixture is placed in a bomb as in the other examples, pressured with CO and $O_2$ (2.8 bar and 62.1 bar respectively) and reacted for 2 hours at 20° C. No hydrogen peroxide is found.

Repeat experiments using three and six times larger amounts of the triphenyl phosphate (0.23 g, 0.75 mmole and 0.46 g, 1.5 mmole) also produce no hydrogen peroxide.

EXAMPLE 11

(Comparative)

Platinum compounds appear to be ineffective as compared with the equivalent palladium compounds, as the following experiments show.

Bis (benzonitrile) platinum dichloride (0.0118 g, 0.025 mmole) and triphenyl arsine (0.306 g, 1 mmole) are dissolved in 1,2,4-trichlorobenzene (20.0 g). Water (6.0 g) and concentrated sulfuric acid (0.1 g) are added to form a second phase. The mixture is reacted in a bomb as before, under partial pressures of 2.8 bar CO and 66.2 bar $O_2$, for 2 hours at 20° C. No hydrogen peroxide is found.

Repeat experiments using varying amounts of triphenyl arsine (0.25 mmoles, 0.50 mmoles, 2.0 mmoles) also produce no hydrogen peroxide.

EXAMPLE 12

(Comparative)

Heterogeneous catalysts appear not to produce hydrogen peroxide, as the following experiment shows.

Three solid catalysts, one having 5 wt. % Pd on alumina (0.025 mmoles Pd), another 5 wt. % Pd on carbon, and a third 5 wt. % Pd on silica are tried as catalysts with a mixture of 1,2,4-trichlorobenzene (10.0 g), water (6.0 g) and concentrated sulfuric acid (0.2 g). As before, a glass lined bomb is used and the reaction carried out for 2 hours at 20° C., with 2.8 bar CO and 62.1 bar $O_2$. No hydrogen peroxide is found with any of the three supported catalyst.

EXAMPLE 13

Various solvents have been found useful, as the following experiments show.

Palladium acetate (0.0056 g, 0.025 mmole) and triphenyl arsine (0.306 g, 1 mmole) are dissolved in 6.0 g of dichloromethane. Water (6.0 g) and concentrated sulfuric acid (0.4 g) are added to form a second phase. The resulting mixture is reacted in a glass lined bomb under the conditions of the previous example and 0.5 wt. % hydrogen peroxide is found in the aqueous phase, equivalent to 37 turnovers based on the amount of palladium present.

A repeat experiment using 1,2-dichloroethane and 12.0 g water produces 0.09 wt. % hydrogen peroxide, equivalent to 13 turnovers of the palladium.

Example 2 illustrates the use of 1,2-dichloroethane as a solvent.

Arsines of repeat experiments using 10.0 g of perfluoro cyclohexane, hexafluoro benzene, perfluoro (methyl cyclohexane), perfluoro hexane, and 1,1,2-trichlorotrifluoro ethane produce no hydrogen peroxide.

EXAMPLE 14

It has been found important to maintain a relatively low molar ratio of $CO/O_2$, as will be seen in the following experiments.

A series of tests are made in which the total gas pressure is 64.5 bar. Generally, the procedure is the same as described in the earlier examples. Palladium acetate (0.0056 g, 0.025 mmole), triphenylarsine (0.306 g, 1 mmole), dichloromethane (10 g), water (6.0 g) and sulfuric acid (0.4 g) are combined and placed in a glass lined Parr bomb and then pressured up with CO and $O_2$. After 2 hours at 20° C. the aqueous phase was analyzed for hydrogen peroxide with the following results.

TABLE A

| Test | Partial Pressure, bar | | Wt. % | Turnovers |
| | CO | $O_2$ | $H_2O_2$ | |
| --- | --- | --- | --- | --- |
| 14A | 2.1 | 61.3 | 0.43 | 32 |
| 14B | 4.2 | 59.3 | 0.09 | 6 |
| 14C | 6.9 | 56.6 | 0.03 | 1 |

EXAMPLE 15

It has been found that a large excess of the useful ligands above that necessary to solubilize the palladium compound should be used, as will be seen in the following experiment.

Palladium acetate (0.0056 g, 0.025 mmole) and triphenyl arsine (0.0655 g, 0.21 mmole), i.e. an 8/1 molar ratio of As/Pd, are dissolved in 1,2,4-trichlorobenzene (8.0 g). Water (6.0 g) and concentrated sulfuric acid (0.4 g) are added to form a second phase. The mixture is placed in a bomb as before and again reacted at 20° C. for 2 hours under partial pressures of 2.8 bar CO and 62.1 bar $O_2$. The aqueous phase is found to contain 0.11 wt. % hydrogen peroxide, equivalent to 8 turnovers of the palladium present.

The same experiment carried out using twice the amount of triphenyl arsine (0.131 g, 0.42 mmole) produces a solution containing 0.26 wt. % hydrogen peroxide, equivalent to 20 turnovers of the palladium present.

The same experiment carried out with five times as much triphenyl arsine (0.306 g, 1 mmole) produces 0.61 wt. % hydrogen peroxide, equivalent to 43 turnovers based on the palladium present.

EXAMPLE 16

Palladium acetate (0.0056 g, 0.025 mmole) and tris (p-trifluoromethyl phenyl) phosphine (0.232 g, 0.5 mmoles) are dissolved in 8.0 g of hexafluorobenzene. Water (6.0 g) and concentrated sulfuric acid (0.1 g) are added to form a second phase and then the mixture is placed in a glass lined bomb as before and pressured to partial pressures of 4.1 bar of carbon monoxide and 61.2 bar of oxygen. After two hours reaction at 20° C., the aqueous phase is found to contain 0.18 wt. % hydrogen peroxde, equivalent to 13 turnovers of the palladium present.

EXAMPLE 17

Palladium acetate (0.0056 g, 0.025 mmoles) and triphenyl arsine (0.612 g, 2 mmoles) are dissolved in 10.0 g of fluorobenzene. Water (12.0 g) and Nafion (0.8 g) are added to form a second phase and then the mixture is placed in a glass-lined bomb as before and pressured to partial pressures of 2.7 bar of carbon monoxide and 61.2 bar of oxygen. After two hours reaction at 20° C., the aqueous phase is found to contain 0.18 wt. % hydrogen peroxide, equivalent to 17 turnovers of the palladium present.

I claim:

1. A process for producing hydrogen peroxide by reacting carbon monoxide, oxygen, and water in the presence of a palladium catalyst wherein the improvement comprises carrying out said reaction in the presence of a soluble compound of Pd, an arsine ligand, a non-coordinating acid, water, and a solvent for said Pd compound and said ligand, wherein the molar ratio of $CO/O_2$ is in the range of 1/100 to 50/100 and the molar ratio of said arsine ligand/Pd is at least 10/1.

2. The process of claim 1 wherein said solvent is a chlorinated hydrocarbon.

3. The process of claim 2 wherein said solvent is 1, 2, 4 trichlorobenzene.

4. The process of claim 2 wherein said solvent is dichloroethane.

5. The process of claim 2 wherein said solvent is dichloromethane.

6. The process of claim 1 wherein said solvent is monofluoro benzene.

7. The process of claim 1 wherein said arsine ligand is triphenylarsine.

8. The process of claim 1 wherein said soluble Pd compound is a palladium acetate.

9. The process of claim 1 wherein said catalyst is employed in a concentration of 0.001 to 0.5 gm-mol for each liter of working solution.

10. The process of claim 9 wherein said catalyst is employed in a concentration of 0.01 to 0.1 gm-mol for each liter of working solution.

11. The process of claim 1 wherein the molar ratio of carbon monoxide/oxygen is 1/100 to 1/10.

12. The process of claim 1 wherein the temperature is in the range of −78° to +150° C.

13. The process of claim 12 wherein the temperature is in the range of −20° to +50° C.

14. The process of claim 1 wherein said non-coordinating acid is sulfuric acid.

15. The process of claim 1 wherein said non-coordinating acid is trifluoro acetic acid.

16. The process of claim 1 wherein the molar ratio of arsine ligand/Pd is in the range of 20/1 to 100/1.

17. A process for producing hydrogen peroxide by reacting carbon monoxide, oxygen, and water in the presence of a palladium catalyst wherein the improvement comprises carrying out said reaction in the presence of a soluble compound of Pd, at least one phosphine ligand selected from the group consisting of tris (p trifluoro methyl phenyl) phosphine and penta fluoro phenyl diphenyl phosphines, a non-coordinating acid, water, and a solvent for said Pd compound and said ligand, wherein the molar ratio of $CO/O_2$ is in the range of 1/100 to 50/100 and the molar ratio of said phosphine ligand/Pd is at least 10/1.

18. The process of claim 17 wherein said solvent is chlorinated hydrocarbon.

19. The process of claim 18 wherein said solvent is 1,2,4-trichlorobenzene.

20. The process of claim 18 wherein said solvent is dichloromethane.

21. The process of claim 17 wherein said solvent is hexafluoro benzene.

22. The process of claim 17 wherein said phosphine ligand is penta fluoro phenyl diphenyl phosphine.

23. The process of claim 17 wherein said ligand is tris (p trifluoro methyl phenyl) phosphine.

24. The process of claim 17 wherein said soluble Pd compound is palladium acetate.

25. The process of claim 17 wherein said catalyst is employed in a concentration of 0.001 to 0.5 gm-mol for each liter of working solution.

26. The process of claim 17 wherein said catalyst is employed in a concentration of 0.01 to 0.1 gm-mol for each liter of working solution.

27. The process of claim 17 wherein the temperature is in the range of −78° to 150° C.

28. The process of claim 28 wherein the temperature is in the range of −20° to +50° C.

29. The process of claim 17 wherein said non-coordinating acid is sulfuric acid.

30. The process of claim 17 wherein the molar ratio of phosphine ligand/Pd is in the range of 20/1 to 100/1.

31. The process of claim 17 wherein the molar ratio of carbon monoxide/oxygen is 1/100 to 1/10.

* * * * *